(12) United States Patent
Dureau

(10) Patent No.: US 10,110,608 B2
(45) Date of Patent: Oct. 23, 2018

(54) AUTHORIZING TRANSACTION ON A SHARED DEVICE USING A PERSONAL DEVICE

(71) Applicant: GOOGLE LLC, Mountain View, CA (US)

(72) Inventor: Vincent Dureau, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 121 days.

(21) Appl. No.: 14/990,717

(22) Filed: Jan. 7, 2016

(65) Prior Publication Data

US 2017/0201524 A1    Jul. 13, 2017

(51) Int. Cl.
*G06F 11/00* (2006.01)
*H04L 29/06* (2006.01)
*H04L 29/08* (2006.01)

(52) U.S. Cl.
CPC .......... *H04L 63/101* (2013.01); *H04L 67/306* (2013.01)

(58) Field of Classification Search
CPC .................................................. H04L 63/101
USPC ............................................................. 726/4
See application file for complete search history.

(56) References Cited

U.S. PATENT DOCUMENTS

| | | | |
|---|---|---|---|
| 9,032,498 B1* | 5/2015 | Ben Ayed | G06F 21/35 726/9 |
| 2011/0231332 A1* | 9/2011 | Abraham | G06F 21/34 705/325 |
| 2015/0326550 A1 | 11/2015 | Schropfer et al. | |
| 2016/0044385 A1* | 2/2016 | Kareeson | H04N 21/658 725/27 |

* cited by examiner

*Primary Examiner* — Christopher J Brown
(74) *Attorney, Agent, or Firm* — Morgan, Lewis & Bockius LLP

(57) ABSTRACT

Methods and computer systems are used to authorize a transaction. In one aspect, the method includes, at a computer system with one or more processors and memory, receiving a message requesting a transaction of a first media content for display on the public display; detecting one or more devices in proximity to the first device; selecting a second device from the detected one or more devices based on a match of a first user account between the second device and the first device; sending a request for authorizing the transaction to the selected second device; receiving a response to the request for authorizing the transaction from the selected second device; and completing the transaction on the first device using transaction information of the first user account and stored at the first device.

22 Claims, 15 Drawing Sheets

700

(A)

The first device is a media streaming platform and the public display is a television screen. — 720

Storing transaction information of each of one or more user accounts associated with the first device; and
storing one or more authentication challenges associated with each of the one or more user accounts and a response to each authentication challenge,
wherein the first device is a trusted device. — 722

(B)

The first device is configured to detect wireless signals and wherein detecting the one or more devices in proximity to the first device includes detecting presence of the one or more devices using wireless WiFi or Bluetooth signals. — 724

The first device is configured to employ geolocation techniques and wherein detecting the one or more devices in proximity to the first device includes detecting presence of the one or more devices using the gelocation techniques. — 726

Figure 7B

AUTHORIZING TRANSACTION ON A SHARED DEVICE USING A PERSONAL DEVICE

TECHNICAL FIELD

The disclosed implementations relate generally to transaction authorization. More particularly, the disclosed implementations relate to methods, computer systems, and graphical user interfaces for authorizing a transaction on a shared device using a private device.

BACKGROUND

A shared device, such as a television coupled with a set-top box or a desktop computer, is easier for one or more users to view media content than a personal device with a smaller screen. However, the ease of viewing on a shared device with a large display screen also creates different problems.

For example, a first user is requested to enter transaction authorization credentials, e.g., PINs or personal passwords, on a shared device to authorize a transaction on the shared device. Once the first user has provided the requested transaction authorization credentials to clear the transaction, the shared device may continue to provide access, using the transaction authorization credentials of the first user, to the following transactions requested by other users, even when the first user is no longer using the shared device. In another example, the first user enters PINs or personal passwords on the shared device in front of other people who are in the same room watching the television. It is possible for other people to see PINs or personal passwords of the first user thus introducing security concerns.

Thus, it would be desirable to have more effective and efficient ways for a user to clear transactions on a shared device.

SUMMARY

Various implementations of methods, computer systems, and graphical user interfaces within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various implementations are used for creating context-based event entries.

In accordance with some implementations, a method for authorizing a transaction is performed at a computer system (e.g., the media device 102, FIGS. 1-2) having one or more processors and memory. The method includes receiving a message requesting a transaction of a first media content for display on the public display; detecting one or more devices in proximity to the first device; selecting a second device from the detected one or more devices based on a match of a first user account between the second device and the first device; sending a request for authorizing the transaction to the selected second device; receiving a response to the request for authorizing the transaction from the selected second device; and completing the transaction on the first device using transaction information of the first user account and stored at the first device.

In some implementations, a computer system (e.g., the media device 102, FIGS. 1-2), includes one or more processors, and memory storing one or more programs for execution by the one or more processors, the one or more programs include instructions for performing the operations of any of the methods described herein.

In some implementations, a non-transitory computer readable storage medium storing one or more programs, the one or more programs comprising instructions, which, when executed by a computer system (e.g., the media device 102, FIGS. 1-2), cause the computer system to perform the operations of any of the methods described herein. In some implementations, a computer system (e.g., the media device 102, FIGS. 1-2) includes means for performing, or controlling performance of, the operations of any of the methods described herein.

Various advantages of the present application are apparent in light of the descriptions below.

BRIEF DESCRIPTION OF THE DRAWINGS

For a better understanding of the aforementioned aspects of the invention as well as additional aspects and implementations thereof, reference should be made to the Detailed Description below, in conjunction with the following drawings in which like reference numerals refer to corresponding parts throughout the figures.

FIGS. 7A-7D are flowchart diagrams illustrating a method of authorizing a transaction in accordance with some implementations.

Like reference numerals refer to corresponding parts throughout the several views of the drawings.

DETAILED DESCRIPTION

The various implementations described herein include methods, computer systems, and graphical user interfaces (GUIs) for authorizing a transaction on a shared device using a private device.

By using a private device to authorize a transaction on a shared device, instead of authorizing the transaction directly on the shared device, user privacy including identity authentication information, authorization information, and transaction information is better protected. Meanwhile, because most users own and carry a private device, the method and system introduced in the present disclosure are convenient and efficient for the transaction authorization process, thus resulting in an improved user experience and a safer user-machine interface. Also, a private device may provide a more convenient environment for responding to a challenge, such as providing a better keyboard on which to type in text.

It is to be understood that, in the present disclosure, using a private device to authorize transaction of media content on a shared display is discussed as an example. One of ordinary skill in the art would understand that the methods and computer systems for authorizing a transaction on a shared device using a private device as discussed in the present disclosure can be used in any suitable applications or services including, but not limited to purchasing pay-per-view event, renting content, changing subscription settings, managing parental control settings, unlocking a device under parental control, logging into personal applications such as messaging or photos, signing into games, rating TV content.

Numerous details are described herein in order to provide a thorough understanding of the example implementations illustrated in the accompanying drawings. However, some implementations may be practiced without many of the specific details, and the scope of the claims is only limited by those features and aspects specifically recited in the claims. Furthermore, well-known methods and systems have not been described in exhaustive detail so as not to unnecessarily obscure more pertinent aspects of the implementations described herein.

Figure 1:
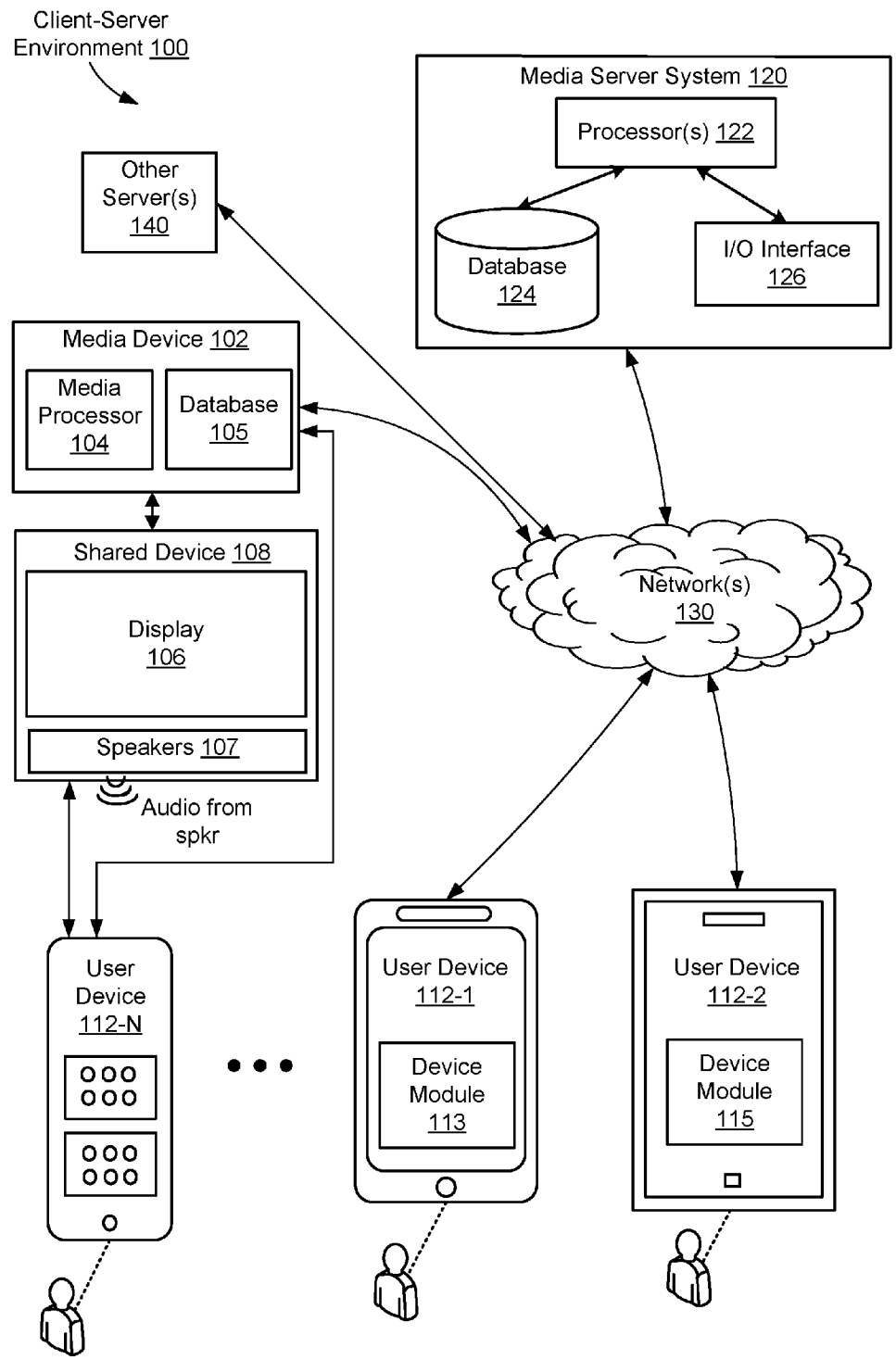
FIG. 1 is a block diagram of a server-client environment in accordance with some implementations.

FIG. 1 is a block diagram of a server-client environment 100 in accordance with some implementations. In some implementations, the server-client environment 100 includes a media device 102 coupled to a shared device 108 (e.g., a television), one or more user devices 112-1, 112-2 ... 112-N associated with respective users, a media server system 120 (e.g., media content providing server), one or more other servers 140 (e.g., credit card companies, other financial processing/authenticating services, social network server, and/or media content websites), and communication network(s) 130 for interconnecting these components. In some implementations, the media device 102 is coupled to the shared device 108 and the media device 102 and/or the shared device 108 are shared by more than one user. In some implementations, one or more user devices 112-1, 112-2 ... 112-N include graphical user interface (GUI) and provide various client-side functionalities (e.g., displaying authorizing request from the media device 102, and inputting response to the authorization request). The media server system 120 provides server-side functionalities (e.g., providing requested media content) to the media device 102 for display.

In some implementations, the media device 102 is a set-top box, a media streaming platform (e.g., Google TV), a receiver for cable TV and/or satellite TV, a digital video recorder (DVR), a digital media receiver, a TV tuner, a computer, and/or any other suitable devices. In some implementations, the media device 102 receives and decodes signals including media content received from the media server system 120 and/or other server(s) 140, and provides audio and video content to the shared device 108 for display. In some implementations, the signals received by the media device 102 are terrestrial over-the-air TV broadcast signals or signals distributed/broadcast on a cable-system or a satellite system. In some implementations, the signals received by the media device 102 are transmitted as data over the networks 130. In some implementations, the media device 102 is shared by more than one user.

In some implementations, the shared device 108 includes a display 106 and a speaker 107 and is coupled to the media device 102. In some implementations, the media device 102 is integrated with the shared device 108 as a single device, such as a smart TV. In some implementations, the shared device 108 is a device shared by more than one user and includes a shared display 106, such as a shared television, a shared computer, a shared laptop computer, a shared tablet computer, a shared smart-phone, a shared projector, and/or the like. In some implementations, the shared device 108 is coupled to the media device 102 via a wireless or wired connection.

Examples of the user devices 112 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control (e.g., the user device 112-N), or a combination of any two or more of these data processing devices or other data processing devices. In some implementations, the one or more user devices are referred to as private devices associated with respective users. In some examples, a private device is owned by a particular user. In some other examples, an operating system of a private device or an application running on the private device is logged in by a particular user using his or her user account. In the present disclosure, both the terms "user device" and "client device" refer to devices at client-side and are interchangeable.

Examples of the one or more networks 130 include local area networks (LAN) and wide area networks (WAN) such as the Internet. The one or more networks 130 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the media server system 120 provides media content (e.g., movies, TV shows, music, video stream, a portion thereof, and/or a reference to the media content) to the media device 102 for display on the shared device 108. In some implementations, the media server system 120 is implemented on one or more stand-alone data processing apparatuses or a distributed network of computers. In some implementations, the media server system 120 also employs various virtual devices and/or services of third party service providers (e.g., third-party cloud service providers) to provide the underlying computing resources, infrastructure resources, and/or the media content of the media server system 120.

In some implementations, the one or more servers 140 include a financial processing/authenticating server to verify the transaction information and provide verifying result to a requesting system, e.g., the media device 102 and/or the media server system 120. In some implementations, the one or more servers 140 include a social network server provide various social networking functionalities.

As shown in FIG. 1, the server-client environment 100 includes both a client-side portion (e.g., the user devices 112-1 ... 112-N and the media device 102) and a server-side portion (e.g., media server system 120 and other servers 140). In some implementations, data processing (e.g., transaction requesting and authorizing) is implemented as a standalone application installed on a client device (i.e., a user device). Alternatively, the division of functionalities between the client-side and server-side portions of data processing in the server-client environment 100 can vary in different implementations. For example, in some implementations, the user device is a thin-client that provides only user-facing input and output processing functions, and delegates all other data processing functionalities to the media device 102 and/or a backend server (e.g., the media server system 120).

Figure 2:
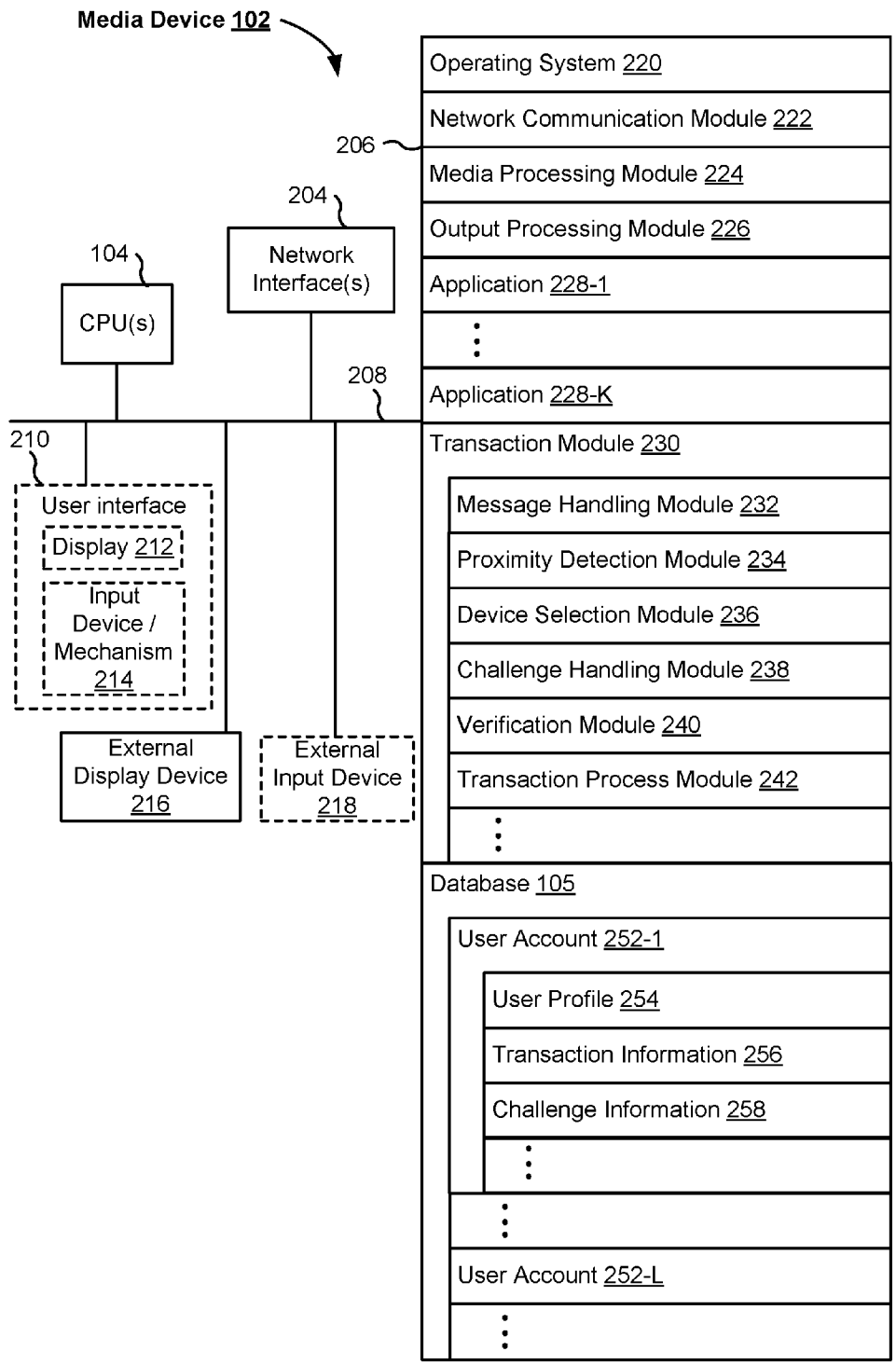
FIG. 2 is a block diagram illustrating an electronic device coupled to a shared display in accordance with some implementations.

FIG. 2 is a block diagram illustrating an example implementation of an electronic device (e.g., the media device 102 of FIG. 1) coupled to a shared display. In some implementations, the media device 102 includes one or more processing units (CPUs) 104, one or more network interfaces or other communications interfaces 204, memory 206, Input/Output (I/O) interface 210, and one or more communication buses 208 for interconnecting these components. Communication buses 208 may include circuitry (sometimes called a chipset) that interconnects and controls communications between system components.

In some implementations, the media device 102 also includes a user interface that presents a graphical user interface (GUI) using one or more output devices and receives user inputs via one or more input devices. In some optional implementations, the media device 102 includes a user interface 210 comprising zero or more display devices 212 (e.g., a screen or monitor) and zero or more input devices or mechanisms 214. In some implementations, the media device 102 is coupled to an external display device 216 (e.g., the shared device 108 of FIG. 1) and/or an external input device 218 (e.g., the remote control 112-N of FIG. 1). The one or more output devices, typically including one or more visual displays and optionally including one or more speakers, enable presentation of media content by the media device 102. In some implementations, the one or more input devices include user interface components that facilitate user input, such as a keyboard, a mouse, a voice-command input unit or microphone, a touch screen display, a touch-sensitive input pad, a camera, a gesture capturing camera, and/or other input buttons or controls, and optionally include two or more of such input devices. Furthermore, the media device 102 may use a microphone and voice recognition, or a camera and iris/face recognition to supplement or replace a physical or virtual keyboard. In some implementations, the media device could also be an audio only device, such as a wireless audio receiver or Internet radio.

Memory 206 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally further includes one or more storage devices remotely located from the CPU(s) 104 (e.g., cloud storage). Memory 206, or alternately the non-volatile memory device(s) within the memory 206, comprises a non-transitory computer readable storage medium. In some implementations, the memory 206 or the computer readable storage medium of the memory 206 stores the following programs, modules and data structures, or a subset or superset thereof:

- operating system 220, which includes procedures for handling various basic system services and for performing hardware dependent tasks;
- network communication module 222, which is used for connecting media device 102 to other computer systems (e.g., the media server system 120, the one or more other servers 140, and/or the user devices 112-1 . . . 112-N) via the one or more communications network interfaces 204 (wired or wireless) and one or more networks 130 (FIG. 1), such as the Internet, other wide area networks, local area networks, metropolitan area networks, and so on;
- media processing module 224, for receiving, managing, and processing media content received from content source (e.g., the media server system 120 and/or the other servers 140);
- output processing module 226 for communicating with the shared device 108 with a shared display 106 to display the processed media content;
- application module(s) 228-1 . . . 228-K for execution by the media device 102, such as games, application marketplaces, payment platforms, social network platforms, and/or other applications;
- transaction module 230 for processing transaction requests, the transaction module 230 including, but not limited to, one or more of the following modules:
  - messaging handling module 232 that handles various messages from the user devices, the various messages including, but not limited to, a request for a transaction of a media content for display on the display, or a response to a transaction authorization challenge;
  - proximity detection module 234 that detecting one or more devices in proximity to the media device 102 using any suitable communication technology (e.g., wireless connection, Bluetooth®, radio-frequency identification (RFID), global positioning system (GPS), Wi-Fi-based positioning system (WPS));
  - device selection module 236 that selects a device from the detected one or more devices in proximity to the media device 102 based on a match of a user account between the media device 102 and the detected devices in proximity (e.g., user devices 112-1 . . . 112-N);
  - challenge handling module 238 that sends a authorization request, e.g., an authentication challenge, to a selected user device in proximity;
  - verification module 240 that verifies a response to a challenge question received from one or more devices in proximity, for example, by comparing the received response with the pre-stored responses to the authentication challenges; and
  - transaction process module 242 that sends the pre-stored transaction information of a user account to the other servers 140 (e.g., credit card companies or other financial processing/authenticating services) for authentication; and
- media device database 105, which stores data related to one or more user accounts 252-1 . . . 252-L used for authorizing transaction, the database 105 for each user account including the following data structures, or a subset or superset thereof, but is not limited to:
  - user profile 254 that stores user information including a user account name, login credentials, custom parameters (e.g., age, location, hobbies, etc.), social network contacts, groups of contacts to which the user belongs, and identified trends and/or likes/dislikes associated with the user account;
  - transaction information 256 that stores payment data of the user account 252-1 to process a transaction, such as linked credit card information (e.g., number, CVV code, expiration date, etc.), gift card information (e.g., gift card number and PIN), billing address, and/or shipping address; and
  - challenge information 258 that stores authentication challenges and respective responses to the authentication challenges associated with the user account 252-1, for example, the challenge information including pre-defined questions and respective responses to the pre-defined questions, authentication information (e.g., PINs or passwords), and/or biometric authentication information (e.g., voice authentication, face or iris identification, fingerprint authentication).

Each of the above identified elements may be stored in one or more of the previously mentioned memory devices of the media device 102, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above. Each of the above identified components can also be located in the cloud as part of the media server system 120.

Figure 3:
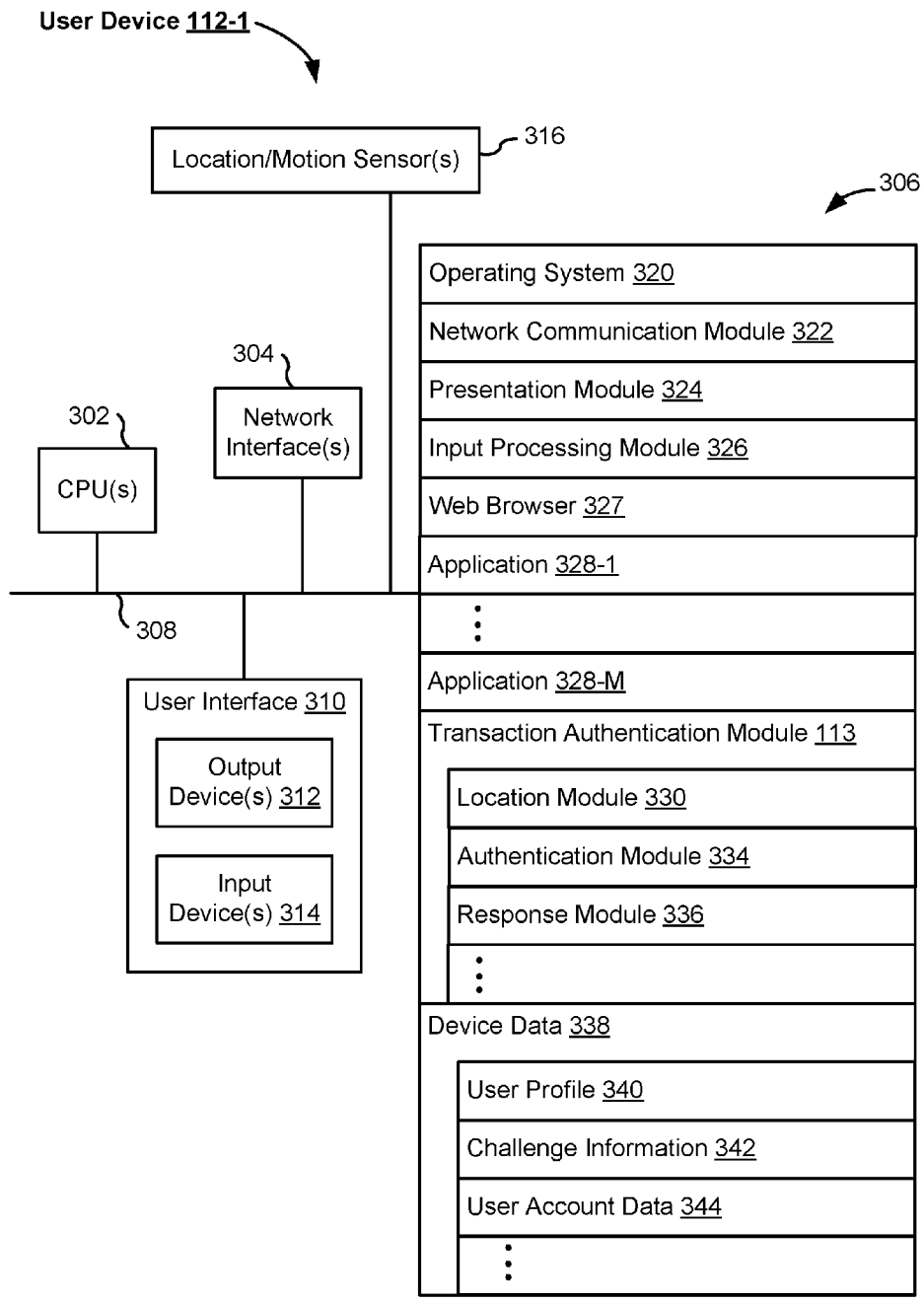
FIG. 3 is a block diagram illustrating a user device in accordance with some implementations.

FIG. 3 is a block diagram illustrating an example implementation of a user device (e.g., the user device 112-1 of FIG. 1). In some implementations, the user device 112-1 includes one or more processing units (CPUs) 302, one or more network interfaces or other communications interfaces 304, user interface 310, memory 306, and one or more communication buses 308 for interconnecting these components. Communication buses 308 may include circuitry (sometimes called a chipset) that interconnects and controls communications between system components.

In some implementations, the user interface 310 presents a graphical user interface (GUI) using one or more output devices 312 and receives user inputs via one or more input devices 314. The one or more output devices 312, typically including one or more visual displays and optionally including one or more speakers, enable presentation of media content by the user device 112-1. In some implementations, the one or more input devices 314 include user interface components that facilitate user input, such as a keyboard, a mouse, a voice-command input unit or microphone, a touch screen display, a touch-sensitive input pad, a camera, a gesture capturing camera, and/or other input buttons or controls, and optionally include two or more of such input devices. Furthermore, the user device 112-1 may use a microphone and voice recognition, or a camera and gesture recognition to supplement or replace a physical or virtual keyboard. In some implementations, the camera is used for face and/or iris recognition for authorizing a transaction. In some implementations, the user device 112-1 includes one or more location/motion sensors 316 which directly or indirectly determine the location of the user device 112-1. In some implementations, the location/motion sensors 316 include, but are not limited to, gyroscopes, accelerometers, and GPS devices.

Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally further includes one or more storage devices remotely located from the CPU(s) 302 (e.g., cloud storage). Memory 306, or alternately the non-volatile memory device(s) within memory 306, comprises a non-transitory computer readable storage medium. In some implementations, memory 306 or the computer readable storage medium of memory 306 stores the following programs, modules and data structures, or a subset or superset thereof:

operating system 320, which includes procedures for handling various basic system services and for performing hardware dependent tasks;

network communication module 322, which is used for connecting the user device 112-1 to other computer systems (e.g., the media device 102, the media server system 120, other servers 140, and/or other user devices 112-2 . . . 112-N) via the one or more communications network interfaces 304 (wired or wireless) and one or more networks 130 (FIG. 1), such as the Internet, other wide area networks, local area networks, metropolitan area networks, and so on;

presentation module 324 for enabling presentation of information (e.g., a user interface displaying an authentication challenge, webpage, game, and/or application, audio and/or video content, text, etc.) at the user device 112-1 via one or more output devices 312 (e.g., displays, speakers, etc.) associated with user interface 310;

input processing module 326 for detecting one or more user inputs or interactions from one of the one or more input devices 314 and interpreting the detected input or interaction, for example, the user inputs or interactions including typing, audio inputs, and/or various biometric inputs;

web browser module 327, for navigating, requesting (e.g., via HTTP), and displaying websites and web pages thereof (these functions can also be implemented in a native application, such as a desktop or smart phone application);

application module(s) 328-1 . . . 328-M, for execution by the user device 112-1, such as games, application marketplaces, payment platforms, social network platforms, and/or other applications;

transaction handling module 113 for implementing the functionalities related to authorizing an transaction at the client side, the transaction module 113 including, but not limited to, one or more of the following modules:

location module 330 that determines a location of the user device 112-1 using the location/motion sensors 316 and/or other suitable technologies, such as Wi-Fi-based positioning system (WPS) or geolocation technologies or other proximity detection technology, such as Bluetooth or ultrasonic audio;

optionally, authentication module 334 that authenticates an input response (e.g., PINs, passwords, or biometric authentication information of the user associated with the user device 112-1) to an authentication challenge, for example, by comparing the input response with the pre-stored responses at the user device 112-1; and response module 336 that sends responses to the authorization requests to the media device 102, the responses to the authorization requests including responses to the challenge questions inputted by the user, or optionally, the authentication result processed by the authentication module 334 of the user device 112-1; and device database 338, which stores data related to one or more users associated with the user device 112-1, the device database 338 including the following data structures, or a subset or superset thereof, but is not limited to:

user profile 340, which stores user information of one or more users of (or associated with) client device 104-1, each user profile including, for example, a user ID, a user account name, login credentials, custom parameters (e.g., age, location, hobbies, etc.), social network contacts, groups of contacts to which the user belongs, and identified trends and/or likes/dislikes associated with the user account;

optionally, challenge information 342, which stores one or more authentication challenges and respective responses to the authentication challenges associated with each user of the user device 112-1, for example, the challenge information including pre-defined questions and respective responses to the pre-defined questions, authentication information (e.g., PINs or passwords), and/or biometric authentications (e.g., voice authentication, face or iris identification, fingerprint authentication); and user account data 344, which stores usage data of respective users of (or associated with) the user device 112-1, each user record including, for example, data authored, saved, liked, or chosen by the user.

Each of the above identified elements may be stored in one or more of the previously mentioned memory devices of the user device 112-1, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some implementations, at least some of the functions of the media device 102 are performed by the user device 112-1, and the corresponding sub-modules of these functions may be located within the user device 112-1. Furthermore, in some implementations, at least some of the functions of the user device 112-1 are performed by the media device 102, and the corresponding sub-modules of these functions may be located within the media device 102. Furthermore, in some implementations, at least some of the functions of the media device 102 and the user devices 112 are implemented and performed by the media server system 120, and the corresponding sub-modules of these functions may be located within the media server system 120. The user devices 112-1, 112-2 . . . 112-N, and the media device 102 shown in FIGS. 1-3, respectively, are merely illustrative, and different configurations of the modules for implementing the functions described herein are possible in various implementations.

Figure 4:
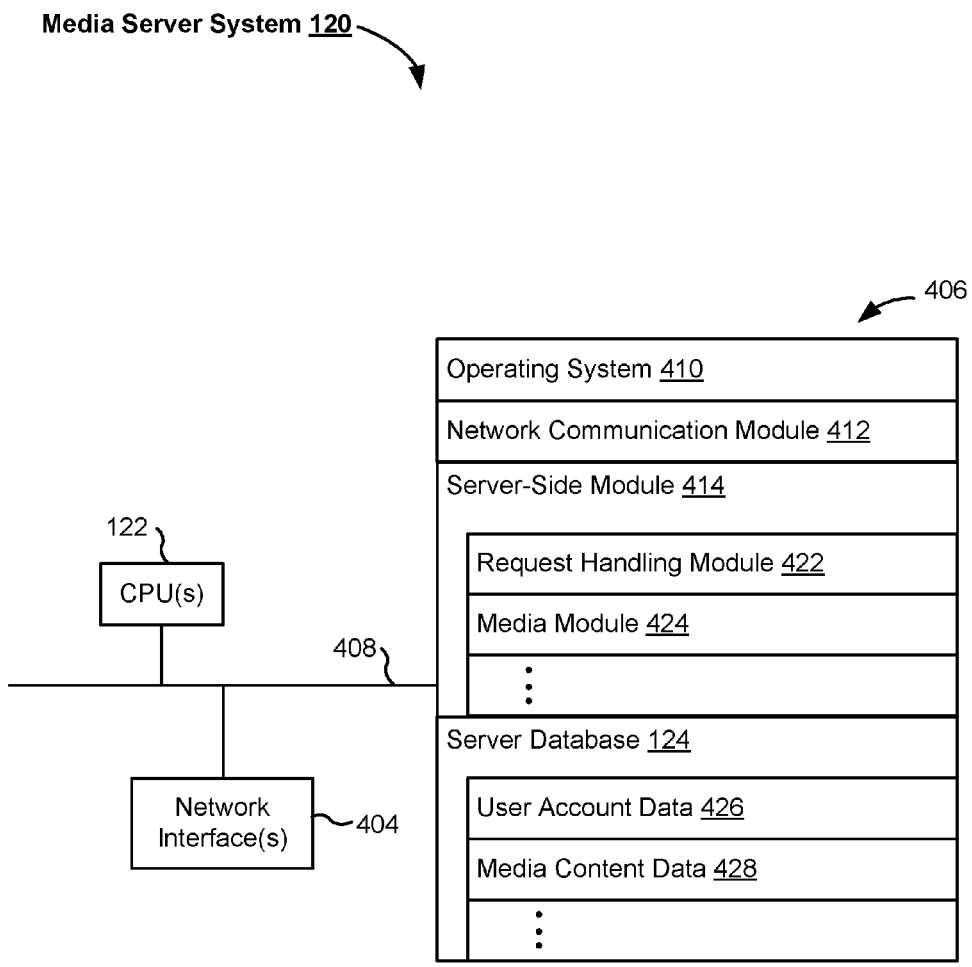
FIG. 4 is a block diagram illustrating a server system in accordance with some implementations.

FIG. 4 is a block diagram illustrating a media server system 120 in accordance with some implementations. The media server system 120 typically includes one or more processing units (CPUs) 122, one or more network interfaces or other communications interfaces 404, memory 406, and one or more communication buses 408 for interconnecting these components. The communication buses 408 may include circuitry (sometimes called a chipset) that interconnects and controls communications between system components. The media server system 120 may optionally include a graphical user interface (GUI) (not shown), which typically includes a display device, a keyboard, a mouse or other pointing device and a touch sensitive display screen.

Memory 406 includes high-speed random access memory, such as dynamic random-access memory (DRAM), static random-access memory (SRAM), double data rate synchronous dynamic random-access memory (DDR RAM) or other random access solid state memory devices; and, optionally, includes non-volatile memory, such as one or more magnetic disk storage devices, one or more optical disk storage devices, one or more flash memory devices, or one or more other non-volatile solid state storage devices. Memory 406 optionally further includes one or more storage devices remotely located from the CPU(s) 122. Memory 406, or alternately the non-volatile memory device(s) within memory 406, comprises a non-transitory computer readable storage medium. In some implementations, memory 406, or the non-transitory computer readable storage medium of memory 406, stores the following programs, modules, and data structures, or a subset thereof:

operating system 410 that includes procedures for handling various basic system services and for performing hardware dependent tasks;

network communication module 412 that is used for connecting the media server system 120 to other computers devices (e.g., the user devices 112-1 . . . 112-N, the media device 102, and/or other servers 140) via the one or more Network Interfaces 404 (wired or wireless) and one or more networks 130 (FIG. 1);

server-side module 414 that receives requests from the media device 102 and/or the user devices 112-1 . . . 112-N, provides data processing, and provides the requested media content to the media device 102, the server-side module 414 including, but not limited to:

request handling module 422 that handles various requests from the media device and/or the user devices, the various requests including requests for media content; and media module 424 that retrieves requested media content and/or links to the requested media content; and server database 124 that stores data including, but not limited to:

user account data 426 storing user profiles each including a user/account name or handle, login credentials, social networking data, payment data, transaction records, custom parameters (e.g., age, location, hobbies, etc.) for the user, social network contacts, groups of contacts to which the user belongs, and identified trends and/or likes/dislikes of the user; and media content data 428 including various media content, metadata of media content, and links to media content, the media content including, but not limited to, TV programs, advertisements, videos, images, music, web pages, email messages, SMS messages, content feeds, advertisements, coupons, playlists, XML documents, and ratings associated with various media content or any combination thereof.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

Although FIG. 4 shows the media server system 120 as a number of discrete items, FIG. 4 is intended more as a functional description of the various features which may be present in a server rather than as a structural schematic of the implementations described herein. In practice, and as recognized by those of ordinary skill in the art, some items shown separately could be combined and some items could be separated. For example, some items shown separately in FIG. 4 could be implemented on single servers and single items could be implemented by one or more servers. The actual number of servers in the media server system 120 and how features are allocated among them will vary from one implementation to another, and may depend in part on the amount of data traffic that the system must handle during peak usage periods as well as during average usage periods.

In some implementations, at least some of the functions of the media server system 120 are performed by the media device 102, and the corresponding sub-modules of these functions may be located within the media device 102. Furthermore, in some implementations, at least some of the functions of the media device 102 are performed by the media server system 120, and the corresponding sub-modules of these functions may be located within the media server system 120. The media device 102 and the media server system 120 shown in FIGS. 1, 2, and 4, respectively, are merely illustrative, and different configurations of the modules for implementing the functions described herein are possible in various implementations.

Figure 5A:
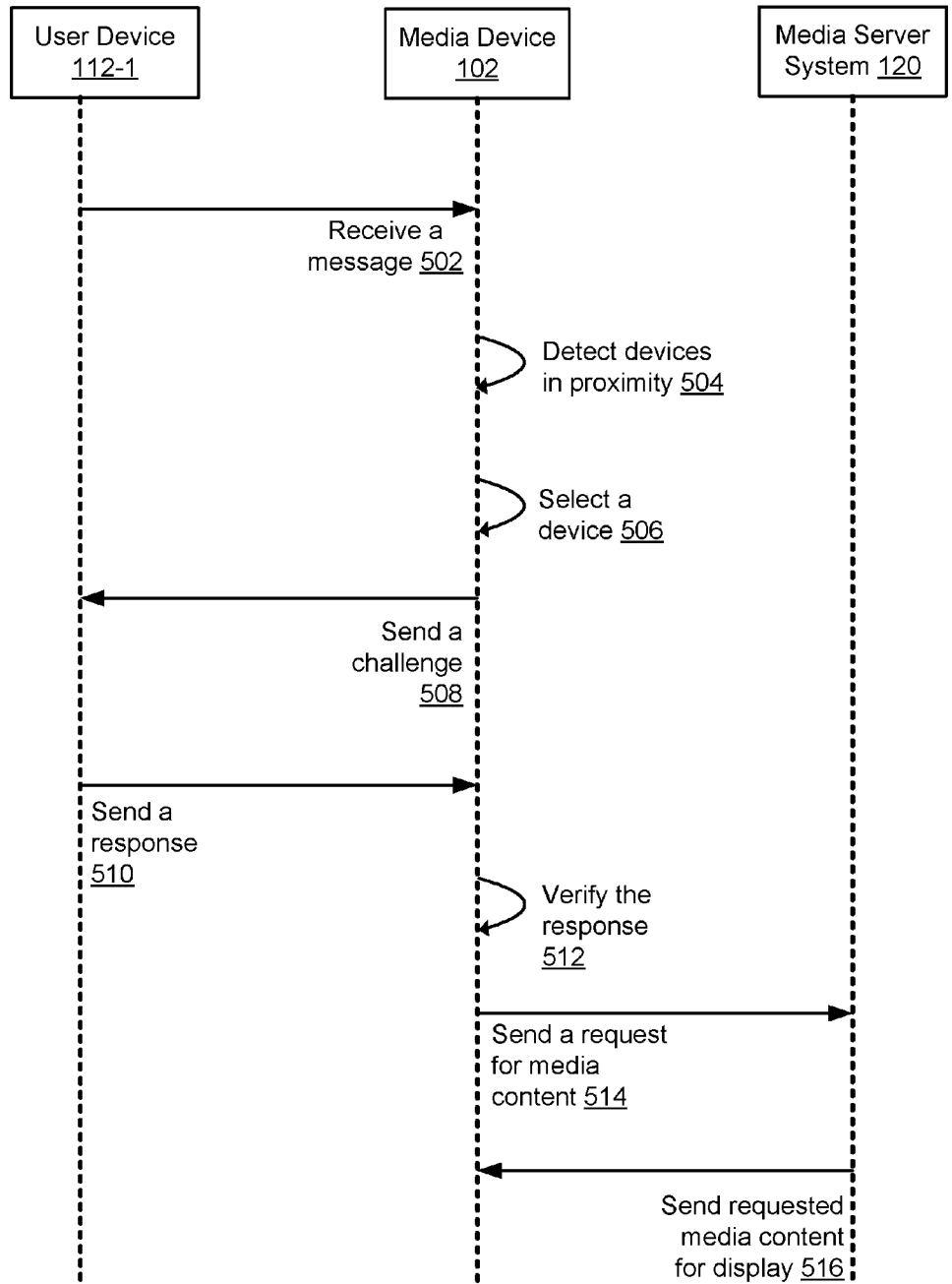
FIG. 5A illustrates a flow diagram of a method of authorizing a transaction on a device in accordance with some implementations.

FIG. 5A illustrates a flow diagram of a method 500 of authorizing a transaction on a device in accordance with some implementations. In some implementations, the method 500 is performed in the sever-client environment 100 (FIG. 1) including the media device 102, one or more user devices 112-1 . . . 112-N, and the media server system 120 each of which includes one or more processors and memory.

As shown in FIG. 5A, the media device 102 receives (502) a message requesting media content for display on the display 106. In some implementations, the media content is paid media content. For example, the message includes a request to purchase an episode of a TV program for display on the display 106 of the shared device 108. In some implementations, the transaction module 230 (e.g., the message handling module 232, FIG. 2) receives (502) and processes the message. In some implementations, the message is sent from one or more user devices (e.g., the user device 112-1 or the remote control 112-N) in proximity to the media device 102.

In response to the request for the transaction of a media content, the media device 102 detects (504) one or more devices, e.g., the user device 112-1 . . . 112-N in proximity to the media device 102. In some implementations, the transaction module 230 (e.g., the proximity detection module 234, FIG. 2) of the media device 102 detects (504) one or more devices in proximity to the media device 102 using any suitable communication technology, such as wireless connection, Bluetooth®, radio-frequency identification (RFID), global positioning system (GPS), or Wi-Fi-based positioning system (WPS).

The media device 102 selects (506) a user device (e.g., the user device 112-1) from the detected one or more devices based on a match of the user account between the user device 112-1 and the media device 102. In some implementations, the transaction module 230 (e.g., the device selection module 236, FIG. 2) of the media device 102 selects (506) the user device 112-1 based on a match between the user account associated with the media device 102 and the user account associated with the user device 112-1. For example, in a situation where an application (e.g., Google Play) running on the media device 102 requests a media content item and is logged in by a first user account, and the user device 112-1 is registered to an owner of the first user account or a related application (e.g., Google Play) is currently active on the user device 112-1 and logged in by the first user account, the transaction module 230 of the media device 102 selects the user device 112-1 based on the match of the first user account between the user device 112-1 and the media device 102. In some implementations, one or more criteria may be used to prioritize which user device with the user account match for selection. For example, the user device used for the most recent transaction with the media device 102 may be prioritized higher for selection. As another example, the user device last seen as active by the media device 102 may be prioritized higher for selection. As a further example, the user device where the user account is logged-in vs logged-out may be may be prioritized higher for selection. In some implementations, a user device may distinguish between available accounts and logged-in accounts; the user may be asked to log into one of the available but not logged-in accounts on a particular use device.

The media device 102 sends (508) a request for authorizing the transaction to the user device 112-1. In some implementations, the transaction module 230 (e.g., the challenge handling module 238, FIG. 2) of the media device 102 sends (508) an authentication challenge to the user device 112-1 as part of the authorization request. In some implementations, the challenge includes pre-defined questions, requests for authentication credential information, and/or requests for biometric authentication. In some implementations, the challenge is stored at the media device 102 (e.g., the challenge information 258, FIG. 2) and associated with the first user account.

The user device 112-1 receives the challenge and prompts a notification on the user interface of the user device 112-1 to request a response from the first user account. In some implementations, after the user inputs a response to the challenge, the user device 112-1 (e.g., the transaction authentication module 113, the authentication module 334, FIG. 3) sends (510) the response (i.e., the user input) to the media device 102 for verification. In some implementations, the authentication module 334 of the user device 112-1 verifies the user's response and the response module 336 of the user device 112-1 sends (510) a verification result to the media device 102.

In some implementations, when the user device 112-1 sends the user input in response to the challenge to the media device 102 for verification, the media device 102 verifies (512) the response. In some implementations, the transaction module 230 (e.g., the verification module 240, FIG. 2) of the media device 102 compares the received response to the pre-defined responses stored at the database 105 (e.g., challenge information 258, FIG. 2).

In some implementations in accordance with a determination that the response to the challenge is correct, the media device 102 sends (514) a request for a media content to the media server system 120. In some implementations, the media device 102 also sends transaction information (e.g., payment information) associated with the first user account and pre-stored at the media device 102 to an external server (e.g., credit card companies, other financial processing/authenticating services) to process the transaction.

In response to the request for the media content, the media server system 120 sends (516) the requested media content to the media device 102 for display on the shared device 108. In some implementations, the request handling module 422 of the media server system 120 processes the request from the media device 102, and the media module 424 of the media server system 120 retrieves the requested media content, the link to the requested media content, and/or other information (e.g., metadata, social networking services, ratings, and/or websites) associated with the requested media content.

Figure 5B:
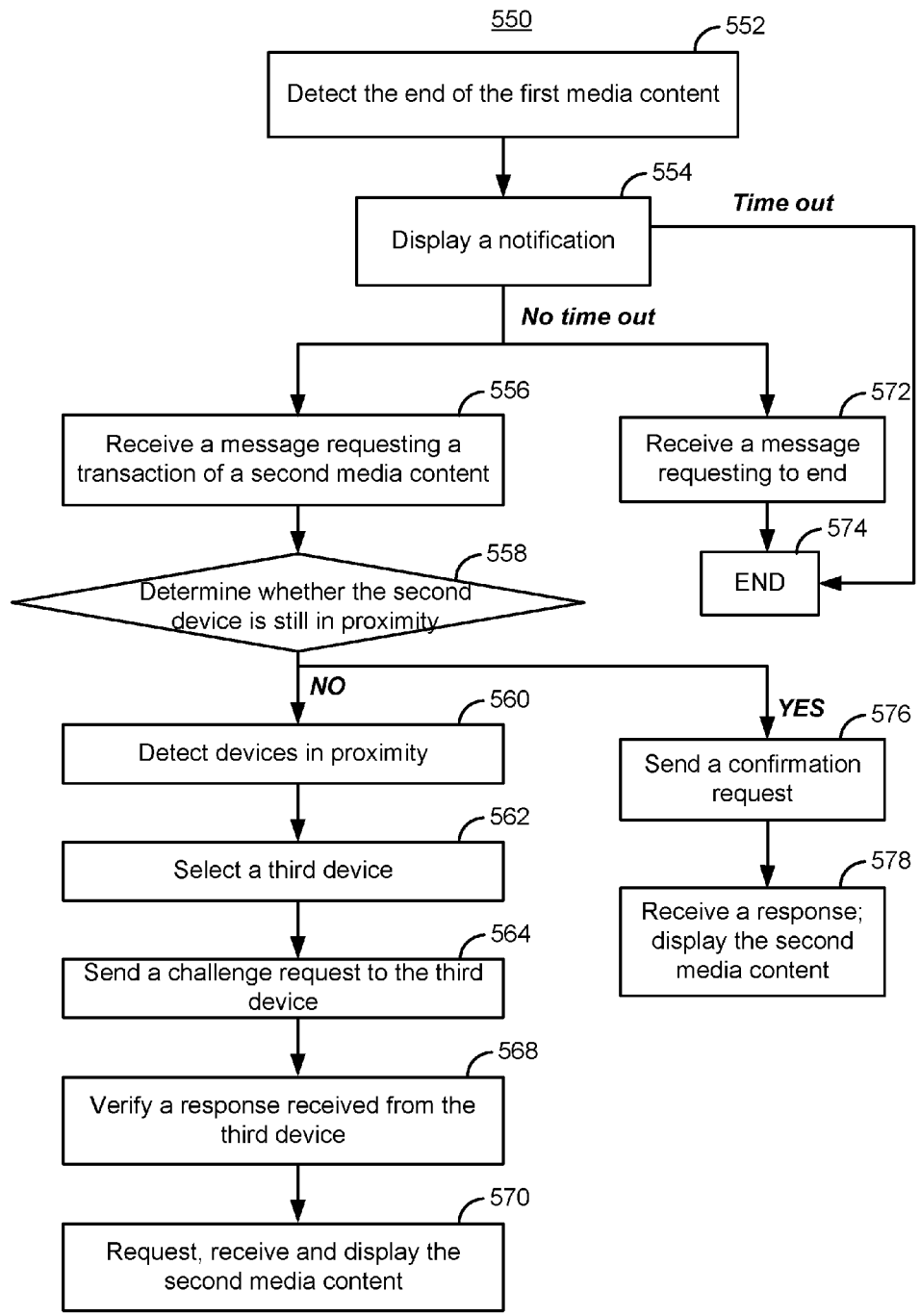
FIG. 5B illustrates a flow diagram of a method for authorizing a transaction on a device in accordance with some implementations.

FIG. 5B illustrates a flow diagram of a method 550 for authorizing a transaction on a device in accordance with some implementations. In some implementations, the method 550 is performed in a sever-client environment 100 (FIG. 1) including the media device 102, one or more user devices 112-1 . . . 112-N, and the media server system 120 each of which includes one or more processors and memory.

The media device 102 detects (552) an end of the requested media content (e.g., from a previous session) being displayed on the shared device 108. In the current session, the media device 102 generates a notification and displays (554) the notification on the display 106 to ask the viewer(s) whether they would like to watch a next media content (e.g., the next episode of a TV program, a media content related to the requested media content from the previous session, or a distinct media content recommended to the viewers).

In some implementations, the media device 102 waits for a predetermined period of time (e.g., one minute or any other suitable time period) after displaying the notification and before proceeding to the next step of the method 550. In some implementations, when the media device 102 detects that no response to the notification is received within the predetermined waiting period, the media device automatically ends (574) the program.

In some implementations, within the predetermined waiting period, a user responds to the notification displayed on the display 106 to indicate the user no longer wants to watch the next media content. For example, the user may press one or more buttons on a remote control (e.g., the user device 112-N) to select "NO" on the display 106, or the user may use a user device to send a user input to indicate his or her intention. The media device 102 receives (572) a message requesting to end the program. In response to the message requesting to end the program, the media device 102 ends (574) the program.

In some implementations, within the predetermined waiting period, a user responds to the notification to indicate the user wants to watch the next media content. For example, the user may press one or more buttons on a remote control (e.g., the user device 112-N) to select "YES" on the display 106, or the user may use a user device to send a user input to indicate his or her intention. The media device 102 thus receives (556) a message requesting a transaction of the next media content.

The media device 102 determines (558) whether the user device detected from the previous session is still in proximity to the media device 102. For example, the user device detected during the previous session (e.g., the user device 112-1) was used for authorizing the transaction for the media content viewed in the previous session.

In accordance with a determination that the detected user device is still in proximity to the media device 102, the media device 102 sends (576) a confirmation request to the detected user device from the previous session (e.g., the user device 112-1) to ask for the user's confirmation on transaction of the next media content. The media device 102 receives (578) a response from the user device, and in accordance with a positive response to the confirmation request, the media device 102 requests and displays (578) the next media content.

In accordance with a determination that the detected user device is no longer in proximity to the media device 102, the media device 102 detects (560) one or more devices in proximity to the media device 102, and selects (562) a user device (e.g., the user device 112-2) based on a match of the user account between the user device 112-2 and the media device 102. For example, the media device detects that an associated application (e.g., Google Play) is currently running on a user device in proximity (e.g., the user device 112-2) and is logged in by a second user account. One or more user accounts that are previously used to log into the media device 102 and stored at the media device 102 (e.g., at database 105, FIG. 2) includes the second user account. Then media device 102 selects (562) the user device 112-2 based on a match of the second user account between the user device 112-2 and the media device 102.

The media device 102 sends (564) a challenge request associated with the second user account to the detected device in the current session (e.g., the user device 112-2). After receiving a response from the user device 112-2, the media device 102 verifies (568) the response by comparing the received response to the pre-defined responses associated with the second user account stored at the database 105 (e.g., challenge information 258, FIG. 2). In some implementations, after authenticating the second user account, the media device 102 automatically switches the user account that is used to log into the related application from the first user account to the second user account.

In some implementations, in accordance with a determination that the response to the challenge is correct, the media device 102 requests (570) the next media content from the media server system 120. The media device 102 then receives and displays (570) the next media content. In some implementations, the transaction for the next media content is processed using transaction information (e.g., payment information) associated with the second user account and pre-stored at the media device 102.

FIGS. 6A-6E are example implementations of graphical user interfaces for authorizing a transaction in accordance with some implementations. The user interfaces in FIGS. 6A-6E are used to illustrate the processes described herein, including the process described with respect to FIGS. 5A-5B and 7A-7D.

Figure 6A:
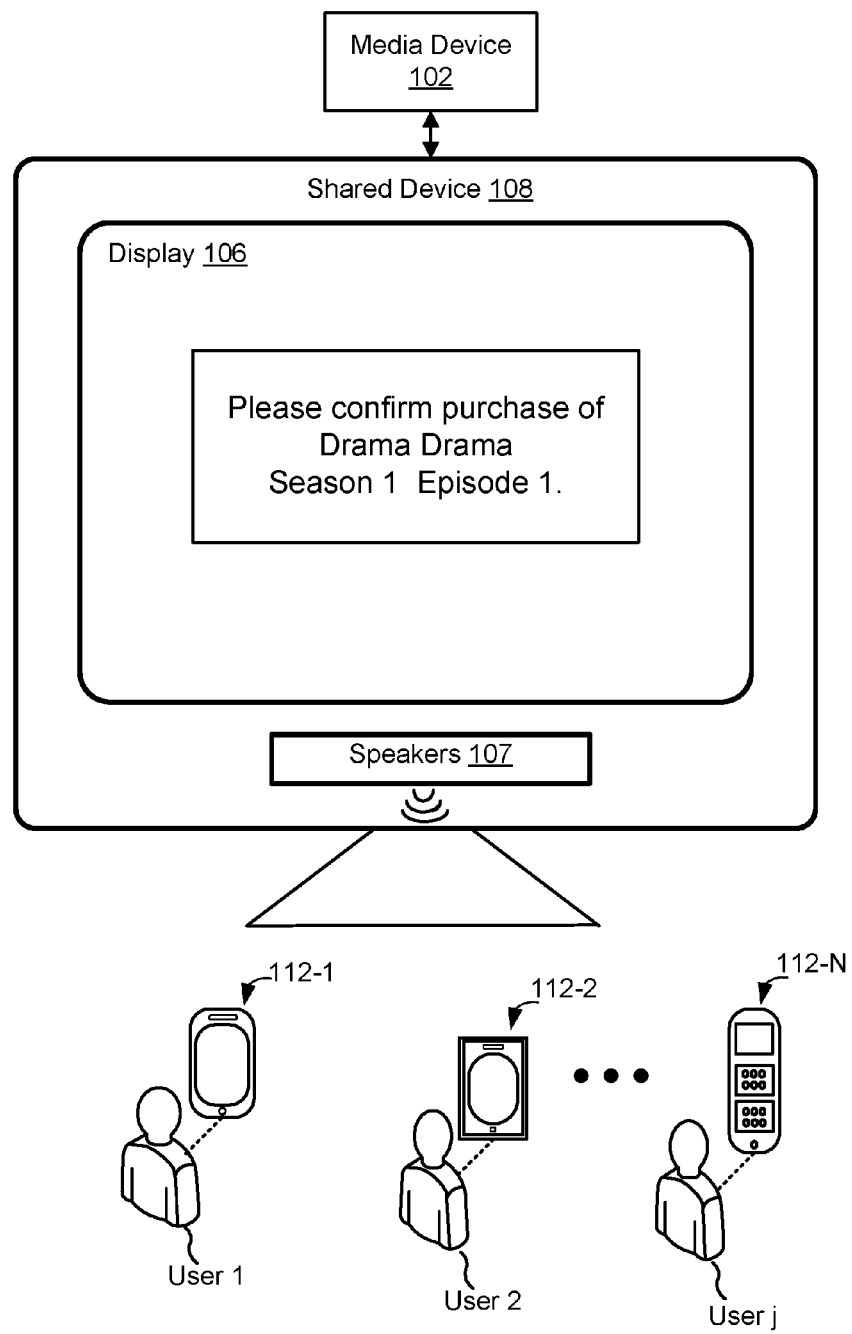
FIGS. 6A-6E are example implementations of graphical user interfaces for authorizing a transaction in accordance with some implementations.

As shown in FIG. 6A, in some implementations, one or more users (e.g., user 1 . . . user j) are in proximity to the shared device 108. The one or more users are associated with one or more user devices 112-1 . . . 112-N respectively. In some implementations, the one or more user devices 112-1 . . . 112-N are private devices that are owned by the one or more users respectively. The media device 102 is coupled to a shared device 108 with the display 106, and the media device 102 is shared by one or more users.

The media device 102 receives a message requesting a transaction of a media content (e.g., Drama Drama Season 1 Episode 1) for display on the display 106. For example as shown in FIG. 6A, the shared device 108 displays a message, e.g., "Please confirm purchase of Drama Drama Season 1 Episode 1." In some implementations, the message is sent by a user using a user device, e.g., a remote control or a mobile phone.

After receiving the message, the media device 102 detects one or more devices, e.g., user devices 112-1 . . . 112-N in proximity to the media device 102. The media device 102 selects a device, e.g., user device 112-1, from the detected one or more devices based on a match of a user account (e.g., user 1) between the media device 102 and the user device 112-1.

Figure 6B:
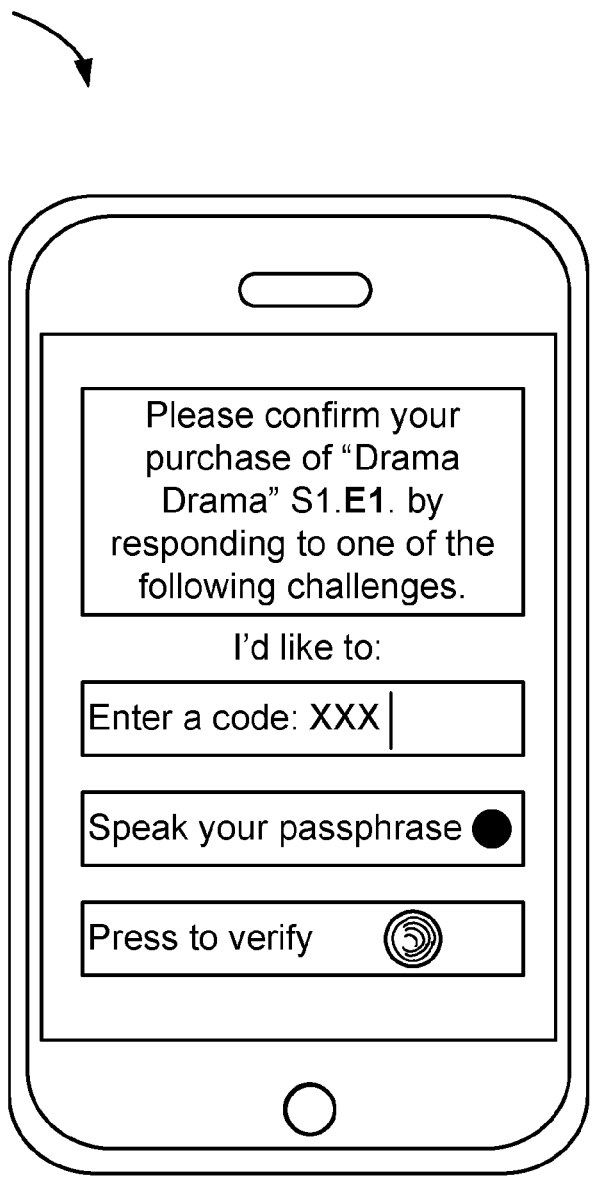

The media device 102 generates and sends a request for authorizing the transaction to the user device 112-1. In some implementations, the request for authorizing the transaction includes one or more authentication challenges associated with user 1. As shown in FIG. 6B, one or more authentication challenges are displayed on the user device 112-1 and include requesting the user to enter a pass code, speak a passphrase, or enter a fingerprint. In some implementations, the user device 112-1 displays one or more authentication challenges for user 1 to authorize the transaction. After receiving a user input, the user device 112-1 sends a response to the request for authorizing the transaction to the media device 102.

Figure 6C:
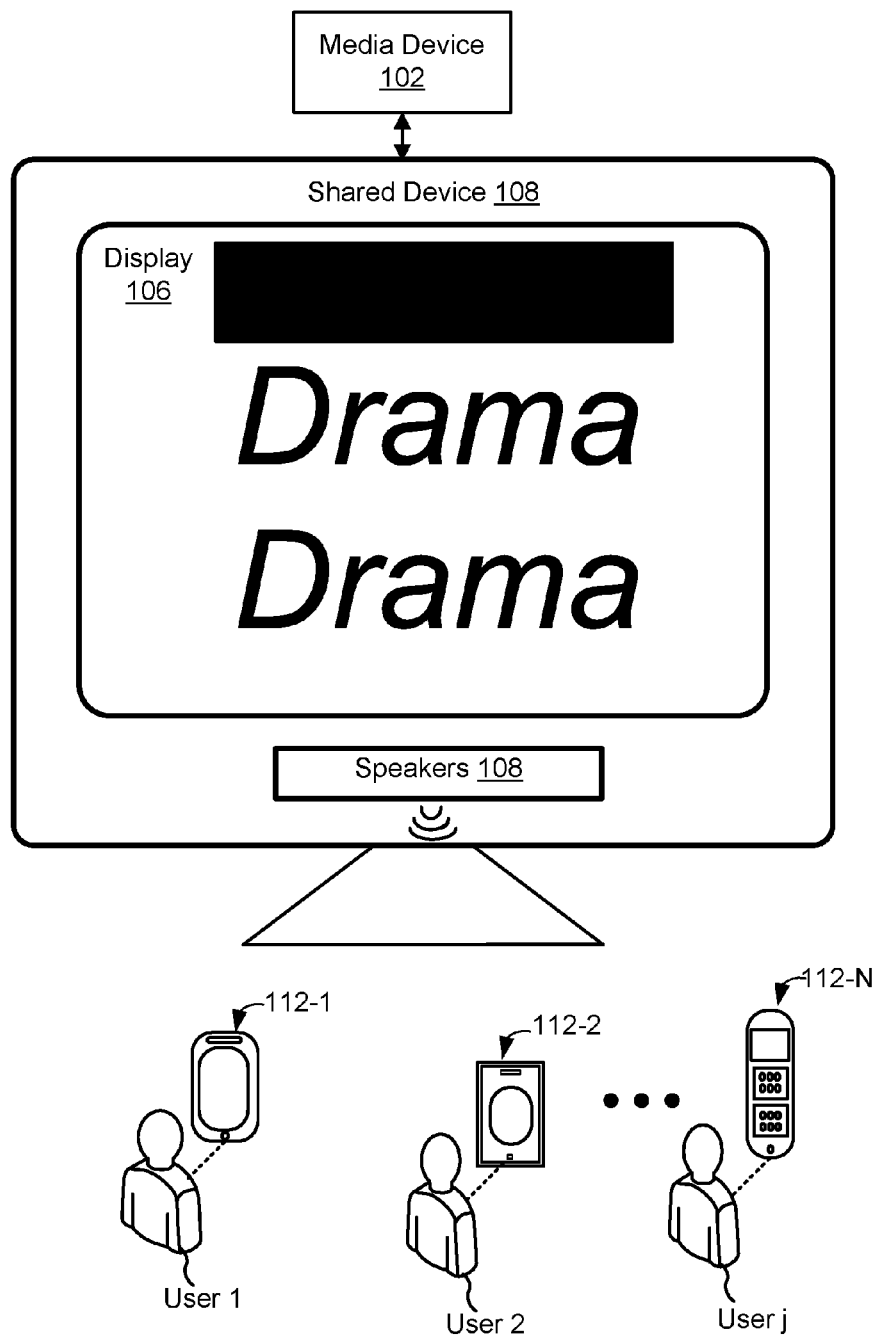

The media device 102 receives the response to the request for authorizing the transaction. In some implementations, the media device 102 receives a verification result from a verification performed at the user device 112-1. In some alternative implementations, the media device 102 receives the user input (e.g., the entered pass code) from the user device 112-1, and compares the user input with the predefined challenge information associated with user 1 and stored at the media device 102. When the user input is determined to match with the challenge information, the media device 102 performs the transaction using transaction information of user 1 and stored at the media device 102. As shown in FIG. 6C, once the transaction is approved, the purchased media content is played on the shared device 108.

As shown in FIGS. 6A-6C, the private user device 112-1 is used for authorizing the transaction, thus no transaction information or any related private authentication information is shared among other users.

Figure 6D:
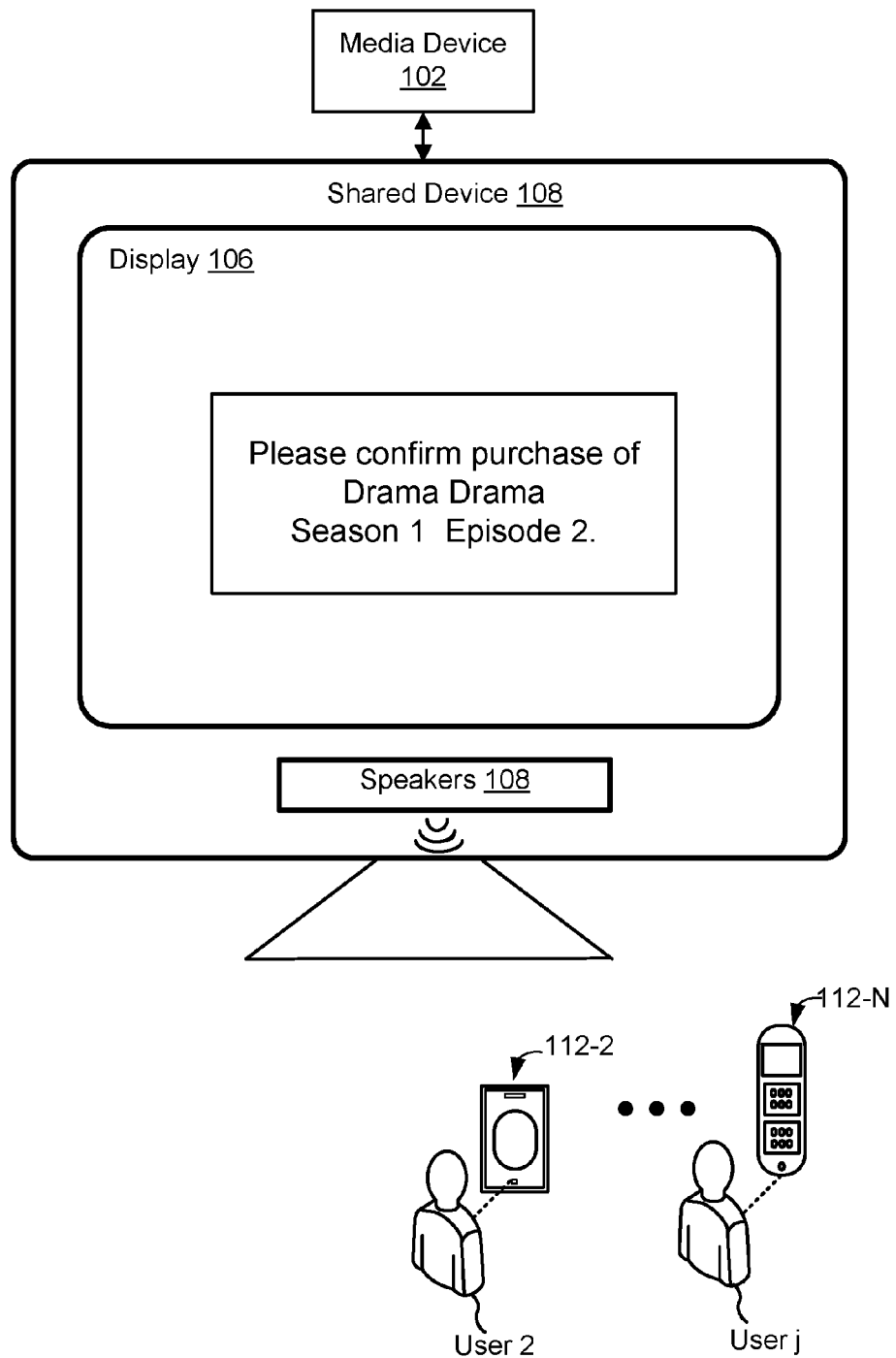

Referring to FIG. 6D, when the purchased media content ends, the media device 102 may request for a confirmation of the transaction of another media content (e.g., Drama Drama Season 1 Episode 2). The media device determines whether the user device 112-1 is still in proximity to the media device 102. As shown in FIG. 6D, user 1 and the associated private user device 112-1 may no longer be in proximity to the media device 102, so the media device 102 detects other device(s) in proximity. The media device 102 selects the user device 112-2 based on a match of a user account (e.g., user 2) between the user device 112-2 and the media device 102. For example, user 2 owns the user device 112-2, and the one or more user accounts stored at the media device 102 include the user account of user 2.

Figure 6E:
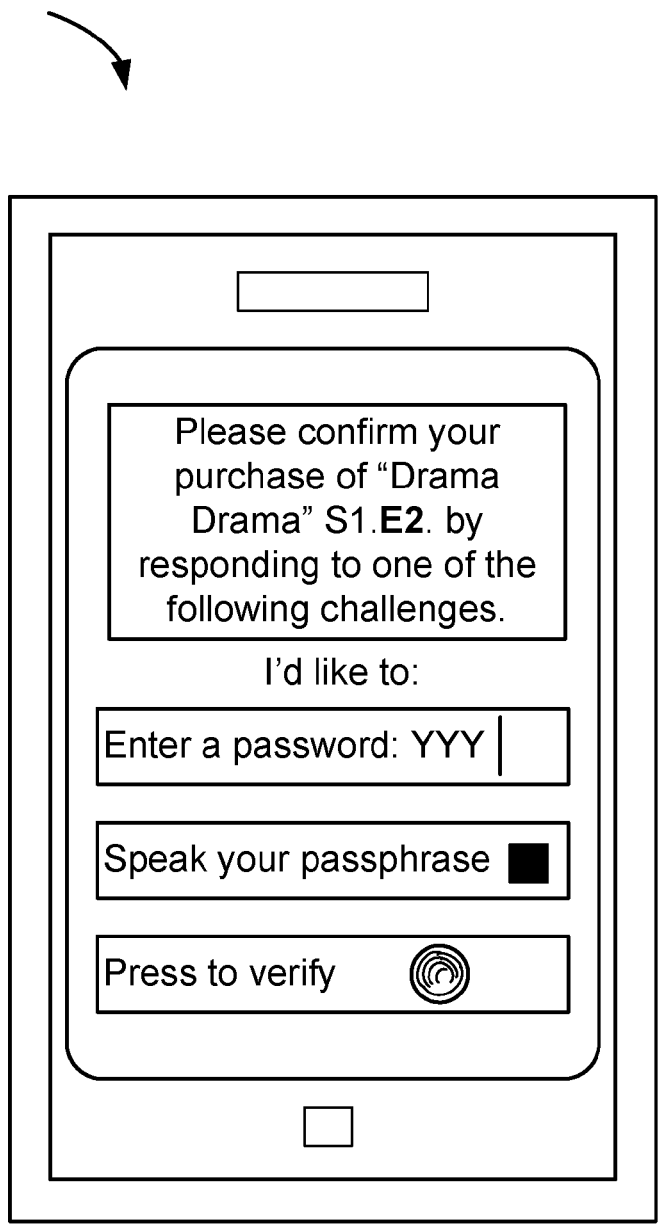

Referring to FIG. 6E, the media device 102 generates and sends a request for authorizing the transaction to the user device 112-2. In some implementations, the request for authorizing the transaction includes one or more authentication challenges associated with user 2. As shown in FIG. 6E, the authentication challenges are displayed on the user device 112-2 requesting the user to enter a pass code, speak a passphrase, or verify using fingerprint. In some implementations, the user device 112-2 displays one or more authentication challenges for user 2 to authorize the transaction. The user device 112-2 sends a response to the request to the media device 102. In some implementations, after user 2 account is authenticated, the user account active on media device 102 is also switched from user 1 to user 2.

FIGS. 7A-7D are flowchart diagrams illustrating a method 700 of authorizing a transaction in accordance with some implementations. The method 700 is performed by a computer system, such as the media device 102, FIGS. 1-2, having one or more processors and memory storing programs (e.g., transaction module 230) executed by the one or more processors. In some implementations, the method 700 is governed by instructions that are stored in a non-transitory computer readable storage medium and the instructions are executed by one or more processors (e.g., CPUs 104, FIGS. 1-2) of the computer system.

In the method 700, the media device 102 receives (702) a message requesting media content for display on the public display 106. The message is issued by a user device (e.g., a remote control or a mobile phone) in proximity to the media device 102. The media device 102 is a trusted device which stores user profile and transaction information associated with each user account. In some implementations, a related application, e.g., Google Play, is currently active and logged in by a user account (e.g., user 1).

In some implementations as shown in FIG. 7B, the media device 102 is (720) a media streaming platform and the public display 106 is (720) a television screen. In some implementations, the media device 102 is (722) a trusted device. As discussed in reference to FIG. 2, in some implementations, the media device 102 stores (722) transaction information, one or more authentication challenges, and a response to each authentication challenge of each user accounts associated with the media device 102. In some implementations, for each user account, different levels of authentication challenges are predetermined based on values of the transactions, ratings of the requested media contents, or predetermined parental control settings, etc. For example, transactions with different value ranges, or media content with different ratings require different authentication challenges to clear the transaction. For example, a more expensive TV show may require a biometric authentication, or more than one authentication challenge from the user. A media content locked with parental control may require biometric authentication from the parent so that a child is unable to clear the transaction without parent's approval. In some implementations, the media device 102 stores information from which an authentication challenge may be inferred, and may infer and generate an authentication challenge based on the stored information. For example, the media device 102 may store the name of the user's high school, and infer and generate, based on the stored name of the user's high school, an authentication challenge that asks for the location of the high school.

In the method 700, the media device 102 detects (704) one or more devices (e.g., user device 112-1 . . . 112-N) in proximity to the media device 102, and the one or more devices are different from the public display 106. In some implementations as shown in FIG. 7B, the media device 102 is configured to detect (724) wireless signals. In some implementations, the media device 102 detects (724) presence of the one or more devices using radio signals such as wireless WiFi, Bluetooth signals, or RFID (radio-frequency identification) signals. In some implementations, the media device 102 is configured to employ (726) geolocation techniques. In some implementations, the media device 102 detects (726) presence of the one or more devices using the gelocation techniques, such as Global Positioning System (GPS), or WiFi triangulation.

In the method 700, the media device 102 selects (706) a user device (e.g., the user device 112-1) from the detected one or more devices based on a match of a first user account (e.g., user 1) between the user device 112-1 and the media device 102.

In some implementations, the selected user device 112-1 is registered as being owned by the first user account. In some implementations, the Google Play application is currently running on the user device 112-1 and logged in by the first user account.

For example, the media device 102 detects a plurality of devices (e.g., user device 112-1 . . . 112-N) in proximity to the media device 102. Each device is associated with (e.g., owned or logged in by) a user account. The media device 102 establishes an encrypted channel to exchange account information with each detected device. The media device 102 receives a list of user accounts associated with the plurality of devices respectively. The media device 102 identifies a user account (e.g., user 1) which is a match between the list of user accounts and one or more user accounts stored at the media device 102. Alternatively, the media device 102 is currently logged in by the user account user 1, and thus the media device 102 selects the user device 112-1 which is owned or logged in by user 1.

In the method 700, the media device 102 sends (708) a request for authorizing a transaction to the selected second device (e.g., the user device 112-1). The media device 102 receives (710) a response to the request for authorizing the transaction from the selected second device. The media device 102 completes (712) the transaction using transaction information associated with the first user account stored at the media device 102.

Figure 7A:
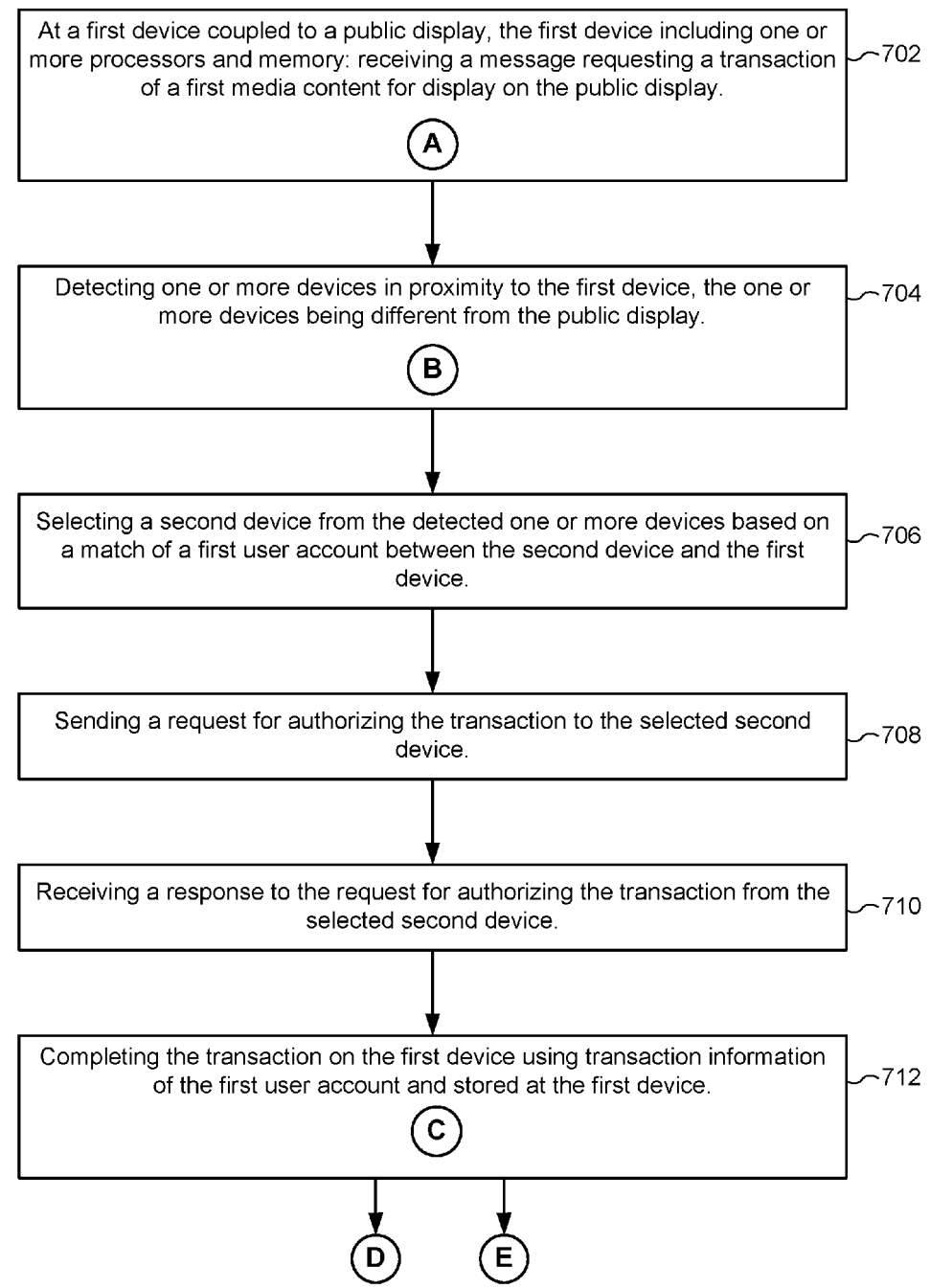
Figure 7C:
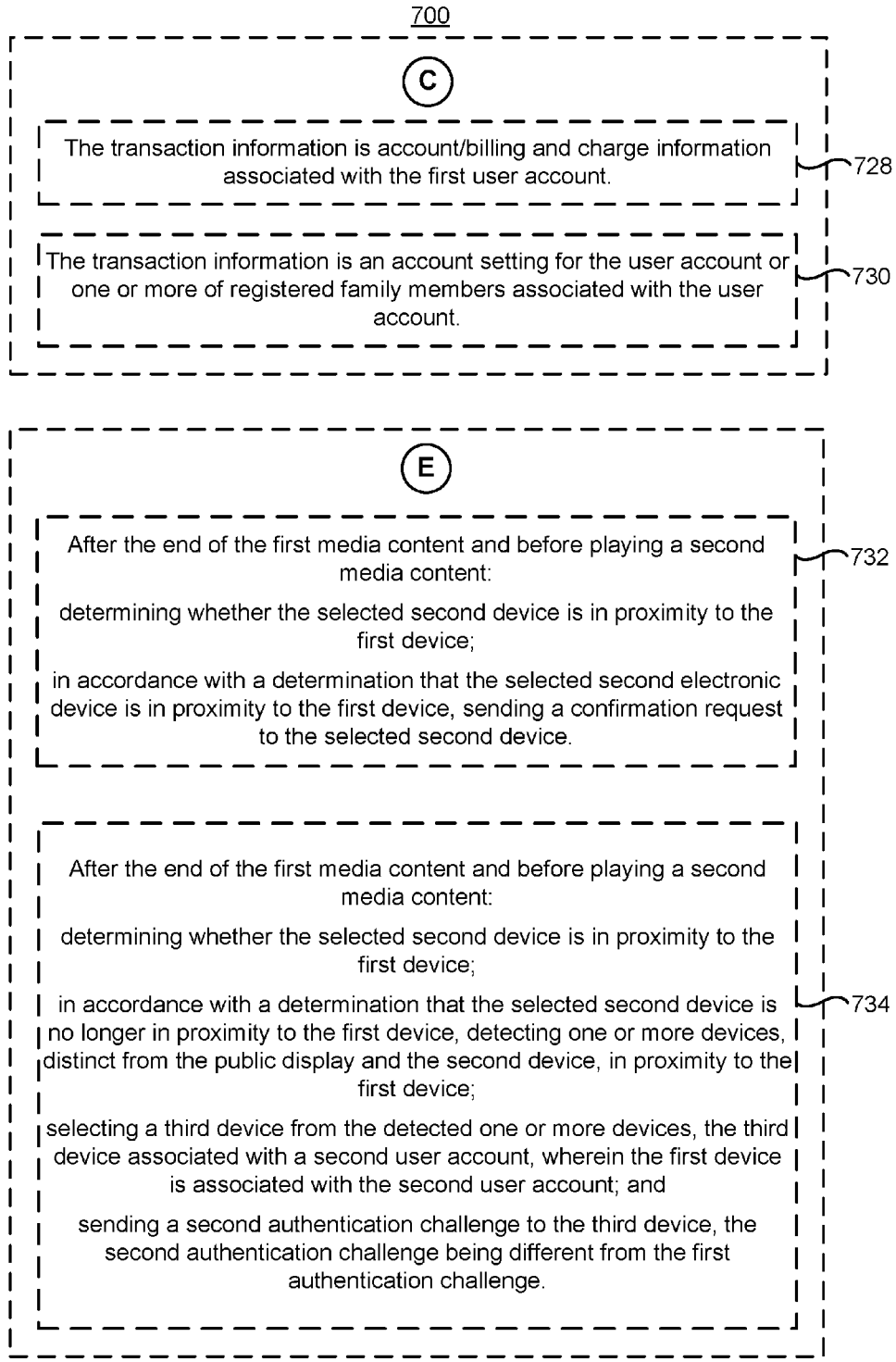

In some implementations as shown in FIG. 7C, the transaction information is (728) account/billing and charge information associated with the first user account. In some implementations, the transaction information is (730) an account setting for the first user account or one or more of registered family members associated with the first user account. The account setting may be a privacy setting.

In some implementations, the media device 102 sends stored transaction information associated with the first user account to a financial authorization server 140 (e.g., a credit card company or other financial service) for verification. If the transaction information is verified, the media device 102 receives the purchased media content and sends the media content to the public display 106 for display.

Figure 7D:
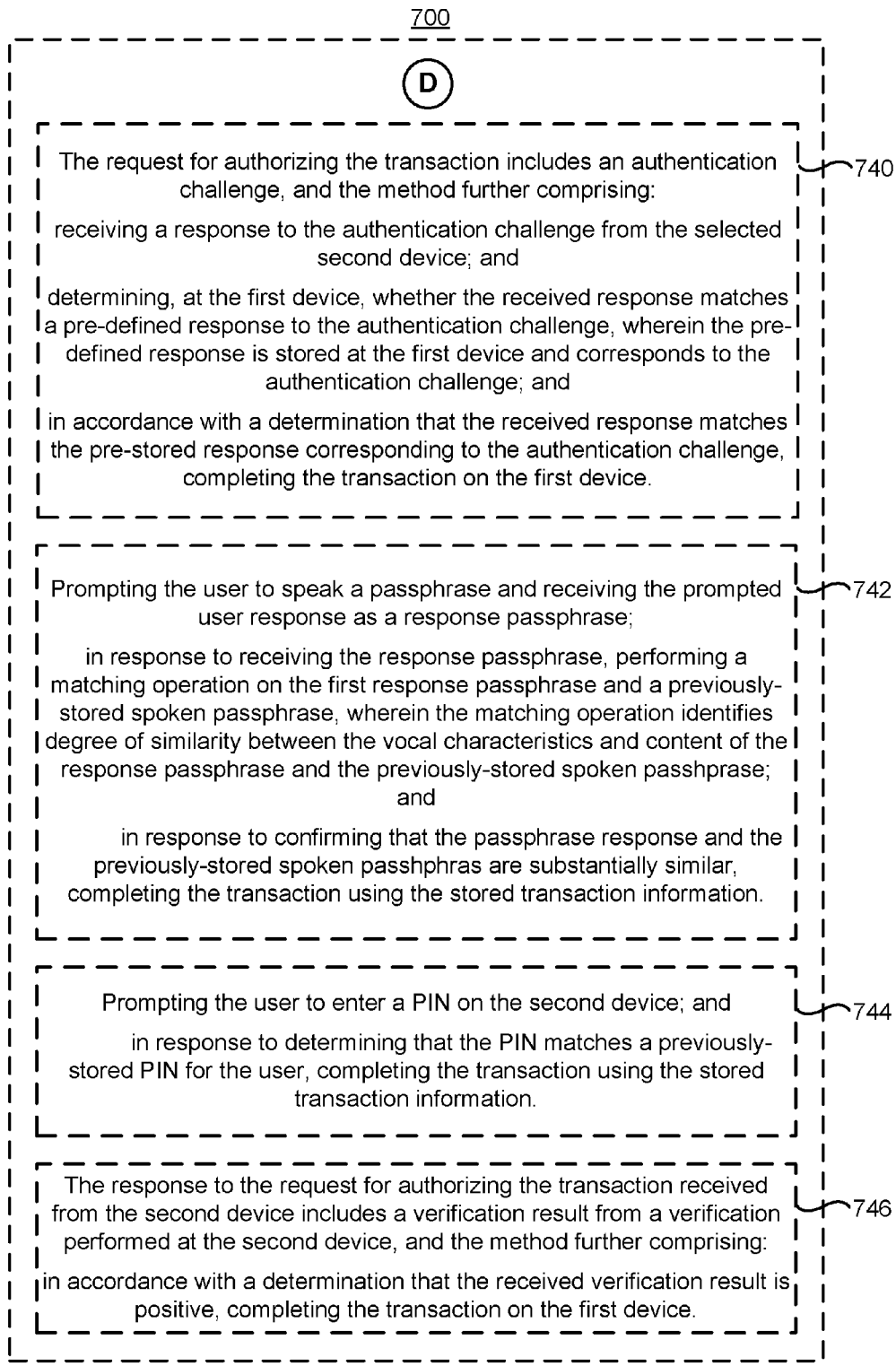

As shown in FIG. 7D, in some implementations, the request for authorizing the transaction includes (740) an authentication challenge. The media device 102 sends the authentication challenge to the user device 112-1. After user 1 inputs a response to the authentication challenge, the media device receives (740) the response directly from the user device 112-1. The media device determines (740) whether the received response matches a pre-defined response to the authentication challenge, wherein the pre-defined response is (740) stored at the media device 102 and corresponds to the authentication challenge. In accordance with a determination that the received response matches the pre-stored response corresponding to the authentication challenge, the media device completes (740) the transaction.

In some implementations, the request for authorizing the transaction from the media device 102 prompts (742) user 1 to speak a passphrase at the user device 112-1, and the user device 112-1 sends the spoken passphrase directly to the media device 102 for verification. The media device 102 receives the spoken passphrase, and performs (742) a matching operation on the passphrase and a pre-stored spoken passphrase stored at the media device 102. In some implementations, the matching operation identifies degree of similarity between the vocal characteristics and/or content of the spoken passphrase and that of a previously-stored spoken passphrase. In some implementations, in response to confirming that the passphrase and a previously-stored spoken passphrase are substantially similar, the media device 102 completes (742) the transaction using the stored transaction information.

In some implementations, the request for authorizing the transaction from the media device 102 prompts (744) user 1 to enter a PIN on the user device 112-1, and the user device 112-1 sends the entered PIN directly to the media device 102 for verification. The media device 102 receives the entered PIN, and performs a verification. In response to determining that the PIN matches a pre-stored PIN for user 1, the media device 102 completes (744) the transaction using the stored transaction information. In some implementations, user 1 is prompted to input a requested biometric authentication, and the media device 102 verifies whether the user entered biometric authentication information matches the pre-stored biometric authentication information of user 1. In some implementations, the PIN may be a pattern (e.g., connecting one or more dots by drawing a particular path on the device); the user is asked to enter the PIN by drawing the pattern on the device.

In some implementations, the verification is performed at the user device 112-1, and the media device 102 receives (746) a verification result from the user device 112-1. In accordance with a determination that the received verification result is positive, the media device completes (746) the transaction. For example, the request for authorizing the transaction includes a request for biometric authentication information from the user, e.g., speaking a passphrase using voice recognition. The user device 112-1 receives the spoken passphrase, performs voice recognition, and verifies whether the content and the vocal characteristics match the corresponding biometric authentication information pre-stored at the user device 112-1. In accordance with a determination that the content and the vocal characteristics of the passphrase match the pre-stored biometric information, the user device 112-1 sends a positive verification result or an instruction to the media device 102 to authorize the transaction.

In some alternative implementations, the media device 102 or the user device 112-1 may send the challenge and the response to the challenge to the media server system 120 for verification. In response to a positive verification result, the media server system 120 sends the requested media content to the media device 102 for display.

In some implementations as shown in FIG. 7C, after the end of the first media content (e.g., Drama Drama Season 1 Episode 1, FIG. 6A) and before playing a second media content (e.g., Drama Drama Season 1 Episode 2, FIG. 6D), the media device 102 determines (732) whether the selected user device 112-1 is still in proximity to the media device 102. In accordance with a determination that the user device 112-1 is still in proximity to the media device 102, the media device 102 sends (732) a request to the user device 112-1 for confirmation of the purchase of the second media content.

In some implementations, the confirmation request maybe a notification to confirm whether user 1 wants to complete the transaction of the second media content. In some implementations, the confirmation request is an authentication challenge. Alternatively, in response to a determination that the user device 112-1 is still in proximity, without requesting for any user authentication or interaction, the media device 102 purchases and retrieves the second media content and displays the second media content on the display 106.

In some implementations, after the end of the first media content and before playing a second media content, the media device determines (734) whether the user device 112-1 is still in proximity to the media device 102. In accordance with a determination that the user device 112-1 is no longer in proximity to the media device 102, the media device detects (734) one or more devices, distinct from the public display 106 and the user device 112-1, in proximity to the media device 102. The media device 102 selects (734) a third device (e.g., the user device 112-2) from the detected one or more devices. Both the user device 112-2 and the media device 102 are associated with a second user account (e.g., user 2). The media device 102 sends (734) an authentication challenge associated with user 2 to the user device 112-2. As shown in FIGS. 6B and 6E, the authentication challenges associated with user 1 are distinct from the authentication challenges associated with user 2.

In some implementations, after the media device 102 receives a response to the authentication challenge from the user device 112-2, the media device 102 verifies the challenge response, and then switches the user account that is currently used to log into the media device 102 from the first user account to the second user account.

Each of the methods described herein is typically governed by instructions that are stored in a computer readable storage medium and that are executed by one or more processors of one or more servers or client devices. The above identified modules or programs (i.e., sets of instructions) need not be implemented as separate software programs, procedures or modules, and thus various subsets of these modules will be combined or otherwise re-arranged in various implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for authorizing a transaction, comprising:
at a first device coupled to a public display, the first device including one or more processors and memory, the first device having a current or prior association with a plurality of user accounts including a first user account:
 receiving from a personal user device a message associated with the first user account requesting a transaction including purchase of a first media content item for display on the public display;
 detecting one or more personal user devices in proximity to the first device, wherein the one or more personal user devices are distinct from the public display and each of the one or more personal user devices is associated with a respective second user account;
 selecting a second device from the detected one or more personal user devices based on a match between the first user account and a particular second user account associated with the second device;
 sending a request for authorizing the transaction to the second device, including causing the second device to display a plurality of user-selectable authentication options;
 receiving a response to the request for authorizing the transaction from the second device, including receiving a user selection of one of the plurality of authentication options and a user authentication input in accordance with the user selected authentication option;
 in accordance with the received response, completing or denying the transaction on the first device, wherein the transaction uses information of the first user account stored at the first device;
 storing, at the first device, transaction information of each of the plurality of user accounts associated with the first device, wherein the transaction information includes two or more of: credit information, gift card information, and billing information; and
 storing, at the first device, one or more authentication challenges associated with each of the plurality of user accounts and a response to each authentication challenge.

2. The method of claim 1, wherein the first device is a media streaming platform and the public display is a television screen.

3. The method of claim 1, wherein the first device is a trusted device.

4. The method of claim 1, wherein the transaction information is the billing and charge information associated with the first user account.

5. The method of claim 1, wherein the transaction information is an account setting for the first user account or one or more of registered family members associated with the first user account.

6. The method of claim 1, wherein the first device is configured to detect wireless signals and wherein detecting the one or more personal user devices in proximity to the first device includes detecting presence of the one or more personal user devices using wireless WiFi or Bluetooth signals.

7. The method of claim 1, wherein the first device is configured to employ geolocation techniques and wherein detecting the one or more personal user devices in proximity to the first device includes detecting presence of the one or more devices using the geolocation techniques.

8. The method of claim 1, further comprising:
after receiving the response to the request for authorizing the transaction from the selected second device, including receiving the user selection of one of the plurality of authentication options and the user authentication input in accordance with the user selected authentication option:
 determining, at the first device, whether the received user selection matches a pre-defined response, wherein the pre-defined response is stored at the first device and corresponds to one of the plurality of authentication options; and
 in accordance with a determination that the received user selection matches the pre-defined response corresponding to the one of the plurality of authentication challenges, completing the transaction on the first device.

9. The method of claim 1, further comprising:
prompting the user of the second device to speak a passphrase and receiving from the user a response passphrase;
in response to receiving the response passphrase, performing a matching operation on the first response passphrase and a previously-stored spoken passphrase, wherein the matching operation identifies degree of similarity between vocal characteristics and content of the response passphrase and the previously-stored spoken passphrase;

confirming the passphrase response and the previously-stored spoken passphrase are similar based on the matching; and in response to the confirming, completing the transaction using the stored information.

10. The method of claim 1, further comprising:
prompting the user to enter a PIN on the second device; and in response to determining that the PIN matches a previously-stored PIN for the user, completing the transaction using the stored information.

11. The method of claim 1, wherein the received response includes a verification result from a verification performed at the second device, and the method further comprising:
in accordance with a determination that the received verification result is positive, completing the transaction on the first device.

12. The method of claim 1, further comprising:
after the end of the first media content item and before playing a second media content item:
determining whether the second device is in proximity to the first device; and
in accordance with a determination that the second device is in proximity to the first device, sending a transaction request to the second device to play the second media content item.

13. The method of claim 1, further comprising:
after the end of the first media content item and before playing a second media content item:
determining whether the second device is in proximity to the first device;
in accordance with a determination that the second device is no longer in proximity to the first device, detecting one or more other personal user devices, distinct from the public display and the second device, in proximity to the first device;
selecting a third device from the detected one or more other personal user devices, the third device associated with a third user account, wherein the first device is associated with the third user account; and
sending to the third device a second request for authorizing a purchase transaction of the second media content item, including causing the third device to display a second plurality of user-selectable authentication options.

14. The method of claim 1, further comprising:
storing, at the first device, user information of the plurality of user accounts;
generating, for each of the plurality of user accounts, an authentication challenge, wherein the authentication challenge is based on the stored user information but is not part of the stored user information and a correct response to the authentication challenge is not in the stored user information;
causing the selected second device to be presented with the authentication challenge;
receiving a user response to the authentication challenge; and
in accordance with the received user response, completing or denying the transaction on the first device.

15. The method of claim 1, wherein the prior association includes a prior transaction with the first device and the current association includes a current login to the first device.

16. An electronic device with a current or prior association with a plurality of user accounts including a first user account, the electronic device comprising:

one or more processors; and
memory; and
one or more programs, wherein the one or more programs are stored in the memory and configured to be executed by the one or more processors, the one or more programs including instructions for:
receiving from a personal user device a message associated with the first user account requesting a transaction including purchase of a first media content item for display on a public display;
detecting one or more personal user devices in proximity to the electronic device, wherein the one or more personal user devices are distinct from the public display and each of the one or more personal user devices is associated with a respective second user account;
selecting a second device from the detected one or more personal user devices based on a match between the first user account and a particular second user account associated with the second device;
sending a request for authorizing the transaction to the second device, including causing the second device to display a plurality of user-selectable authentication options;
receiving a response to the request for authorizing the transaction from the second device, including receiving a user selection of one of the plurality of authentication options and a user authentication input in accordance with the user selected authentication option;
in accordance with the received response, completing or denying the transaction, wherein the transaction uses information of the first user account stored at the electronic device;
storing, at the first device, transaction information of each of the plurality of user accounts associated with the first device, wherein the transaction information includes two or more of: credit information, gift card information, and billing information; and
storing, at the first device, one or more authentication challenges associated with each of the plurality of user accounts and a response to each authentication challenge.

17. The electronic device of claim 16, wherein the electronic device is a trusted device.

18. The electronic device of claim 16, wherein the one or more programs include instructions for:
after receiving the response to the request for authorizing the transaction from the selected second device, including receiving the user selection of one of the plurality of authentication options and the user authentication input in accordance with the user selected authentication option:
determining, at the electronic device, whether the received user selection matches a pre-defined response, wherein the pre-defined response is stored at the electronic device and corresponds to one of the plurality of authentication options; and
in accordance with a determination that the received user selection matches the pre-defined response corresponding to the one of the plurality of authentication challenges, completing the transaction on the electronic device.

19. The electronic device of claim 16, wherein the one or more programs include instructions for:
after the end of the first media content item and before playing a second media content item:

determining whether the second device is in proximity to the electronic device;

in accordance with a determination that the second device is no longer in proximity to the electronic device, detecting one or more other personal user devices, distinct from the public display and the second device, in proximity to the electronic device;

selecting a third device from the detected one or more other personal user devices, the third device associated with a third user account, wherein the electronic device is associated with the third user account; and sending to the third device a second request for authorizing a purchase transaction of the second media content item, including causing the third device to display a second plurality of user-selectable authentication options.

20. A non-transitory computer readable storage medium, storing one or more programs for execution by an electronic device having one or more processors, the electronic device having a current or prior association with a plurality of user accounts including a first user account, the one or more programs including instructions that when executed by the computer system cause the electronic device to:

receive from a personal user device a message associated with the first user account requesting a transaction including purchase of a first media content item for display on a public display;

detect one or more personal user devices in proximity to the electronic device, wherein the one or more personal user devices are distinct from the public display and each of the one or more personal user devices is associated with a respective second user account;

select a second device from the detected one or more personal user devices based on a match between the first user account and a particular second user account associated with the second device;

send a request for authorizing the transaction to the second device, including causing the second device to display a plurality of user-selectable authentication options;

receive a response to the request for authorizing the transaction from the second device, including receiving a user selection of one of the plurality of authentication options and a user authentication input in accordance with the user selected authentication option;

in accordance with the received response, complete or deny the transaction, wherein the transaction uses information associated with the first user account stored at the electronic device;

store, at the electronic device, transaction information of each of the plurality of user accounts associated with the first device, wherein the transaction information includes two or more of: credit information, gift card information, and billing information; and store, at the electronic device, one or more authentication challenges associated with each of the plurality of user accounts and a response to each authentication challenge.

21. The non-transitory computer readable storage medium of claim 20, wherein the one or more programs include instructions for:

after receiving the response to the request for authorizing the transaction from the selected second device, including receiving the user selection of one of the plurality of authentication options and the user authentication input in accordance with the user selected authentication option:

determining, at the electronic device, whether the received user selection matches a pre-defined response, wherein the pre-defined response is stored at the electronic device and corresponds to one of the plurality of authentication options; and in accordance with a determination that the received user selection matches the pre-defined response corresponding to the one of the plurality of authentication challenges, completing the transaction on the electronic device.

22. The non-transitory computer readable storage medium of claim 20, wherein the one or more programs include instructions for:

after the end of the first media content item and before playing a second media content item:

determining whether the second device is in proximity to the electronic device;

in accordance with a determination that the second device is no longer in proximity to the electronic device, detecting one or more other personal user devices, distinct from the public display and the second device, in proximity to the electronic device;

selecting a third device from the detected one or more other personal user devices, the third device associated with a third user account, wherein the electronic device is associated with the third user account; and sending to the third device a second request for authorizing a purchase transaction of the second media content item, including causing the third device to display a second plurality of user-selectable authentication options.

* * * * *